{12} United States Patent
Wellejus et al.

(10) Patent No.: US 11,813,543 B2
(45) Date of Patent: Nov. 14, 2023

(54) TOY CONSTRUCTION SYSTEM WITH ROBOTICS CONTROL UNIT

(71) Applicant: LEGO A/S, Billund (DK)

(72) Inventors: René Christensen Wellejus, Billund (DK); Bjarke Holt Pedersen, Billund (DK); Kevin Nørby Andersen, Billund (DK); Ralph Hempel, Billund (DK); Pelle Normann Brix, Billund (DK)

(73) Assignee: LEGO A/S, Billund (DK)

( * ) Notice: Subject to any disclaimer, the term of this patent is extended or adjusted under 35 U.S.C. 154(b) by 761 days.

(21) Appl. No.: 16/961,293

(22) PCT Filed: Jan. 24, 2019

(86) PCT No.: PCT/EP2019/051720
§ 371 (c)(1),
(2) Date: Jul. 10, 2020

(87) PCT Pub. No.: WO2019/145405
PCT Pub. Date: Aug. 1, 2019

(65) Prior Publication Data
US 2020/0376402 A1 Dec. 3, 2020

(30) Foreign Application Priority Data

Jan. 25, 2018 (DK) .......................... PA 2018 70052

(51) Int. Cl.
*A63H 33/04* (2006.01)
*G05B 19/4155* (2006.01)
*G06F 13/20* (2006.01)

(52) U.S. Cl.
CPC ....... *A63H 33/042* (2013.01); *G05B 19/4155* (2013.01); *G06F 13/20* (2013.01);
(Continued)

(58) Field of Classification Search
CPC .............. A63H 33/042; A63H 2200/00; G05B 19/4155; G06F 13/20
See application file for complete search history.

(56) References Cited

U.S. PATENT DOCUMENTS 3,005,282 A 10/1961 Christiansen
6,902,461 B1 6/2005 Munch et al.
(Continued)

FOREIGN PATENT DOCUMENTS

CN 106267847 A 1/2017
CN 206363709 U 7/2017
(Continued)

OTHER PUBLICATIONS

International Search Report issued in corresponding international application No. PCT/EP2019/051720, dated Jun. 28, 2019. (6 pages).
(Continued)

*Primary Examiner* — Seng H Lim
(74) *Attorney, Agent, or Firm* — Day Pitney LLP; Anthony A. Kassas

(57) ABSTRACT

A toy construction robotics system including a robotics control unit, the robotics control unit comprising: a housing comprising coupling elements configured for releasably interconnecting the robotics control unit with cooperating toy construction elements; a processor comprising programmed instructions; a plurality of I/O-ports connected to communicate with the processor; a plurality of separate light emitters arranged in a two-dimensional array on a front side of the housing, each of the light emitters being operable in response to instructions from the processor so as to produce at least two different indicator states; wherein the light emitters are aligned with respect to the I/O-ports such that each of the I/O-ports has an associated light emitter next to it. The light emitters may be operable, in response to
(Continued)

instructions from the processor, to produce a machine readable code encoding data in respect of the robotics control unit. The machine readable code may comprise instructions for interaction between the robotics control unit and an external device.

26 Claims, 3 Drawing Sheets

(52) U.S. Cl.
CPC .................. *A63H 2200/00* (2013.01); *G05B 2219/39371* (2013.01); *G05B 2219/45007* (2013.01); *G06F 2213/40* (2013.01)

(56) References Cited

U.S. PATENT DOCUMENTS

| 8,690,631 | B2* | 4/2014 | Nag ..................... | A63H 33/086 |
| | | | | 446/128 |
| 10,758,836 | B2* | 9/2020 | Akishbekov ......... | A63H 33/042 |
| 2011/0151743 | A1* | 6/2011 | Munch ................. | A63H 33/042 |
| | | | | 446/91 |
| 2013/0217295 | A1* | 8/2013 | Karunaratne .......... | A63H 30/04 |
| | | | | 446/124 |
| 2016/0339351 | A1* | 11/2016 | Akishbekov ......... | A63H 33/088 |
| 2016/0361662 | A1* | 12/2016 | Karunaratne ........... | G06F 3/038 |
| 2017/0263155 | A1* | 9/2017 | Broms ................. | A63H 33/042 |
| 2019/0105579 | A1* | 4/2019 | Karunaratne ........ | A63H 33/042 |
| 2019/0120447 | A1* | 4/2019 | Campetella ........... | F21V 19/001 |
| 2021/0039005 | A1* | 2/2021 | Akishbekov ......... | A63H 33/042 |
| 2023/0201706 | A1* | 6/2023 | Yang ................... | A63F 3/00643 |
| | | | | 463/14 |

FOREIGN PATENT DOCUMENTS

| DE | 202015103189 U1 | 10/2016 |
| EP | 0031874 A1 | 7/1981 |
| EP | 1 271 415 A1 | 1/2003 |
| EP | 1271415 A1 | 1/2003 |
| EP | 2 341 993 B1 | 6/2013 |
| KR | 20180060376 A | 6/2018 |
| WO | 2000/045924 A1 | 8/2000 |
| WO | 2004/05924 A1 | 1/2004 |
| WO | 2015/199355 A1 | 12/2015 |
| WO | 2016/187517 A1 | 11/2016 |

OTHER PUBLICATIONS

Written Opinion of the International Searching Authority issued in corresponding international application No. PCT/PCT/EP2019/051720, dated Jun. 28, 2019. (9 pages).
International Preliminary Report on Patentability, Response to the Written Opinion, with amended sheets of specification and claims, in corresponding international application No. PCT/EP2019/051720, dated Jan. 10, 2020. (47 pages).
Danish Search Report and Search Opinion issued in priority application No. PA 2018 70052, dated Sep. 19, 2018. (8 pages).
Bigoot—Abilx Krypton, Dec. 21, 2017. [Retrieved Sep. 17, 2018] (1 page) URL: <https://www.youtube.com/watch?v=tYjBOKG6QFc>.
Office Action issued in corresponding Chinese patent application No. 20190009994.4, dated Jun. 22, 2021, 5 pages.
BigFoot—Abilix Krypton, Dec. 21, 2017. [Retrieved Sep. 17, 2018] (1 page) URL: <https://www.youtube.com/watch?v=tYjBOKG6QFc>.

* cited by examiner

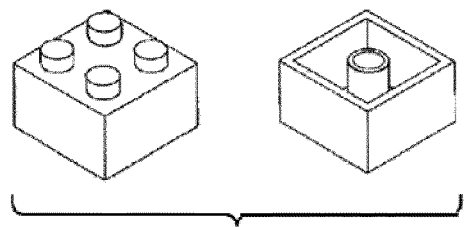
FIG. 1 - PRIOR ART
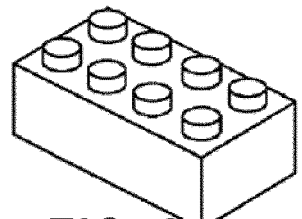
FIG. 2 PRIOR ART
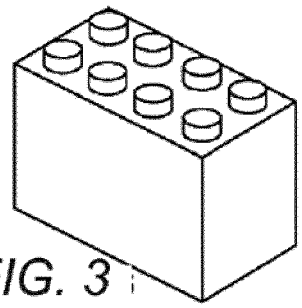
FIG. 3 PRIOR ART
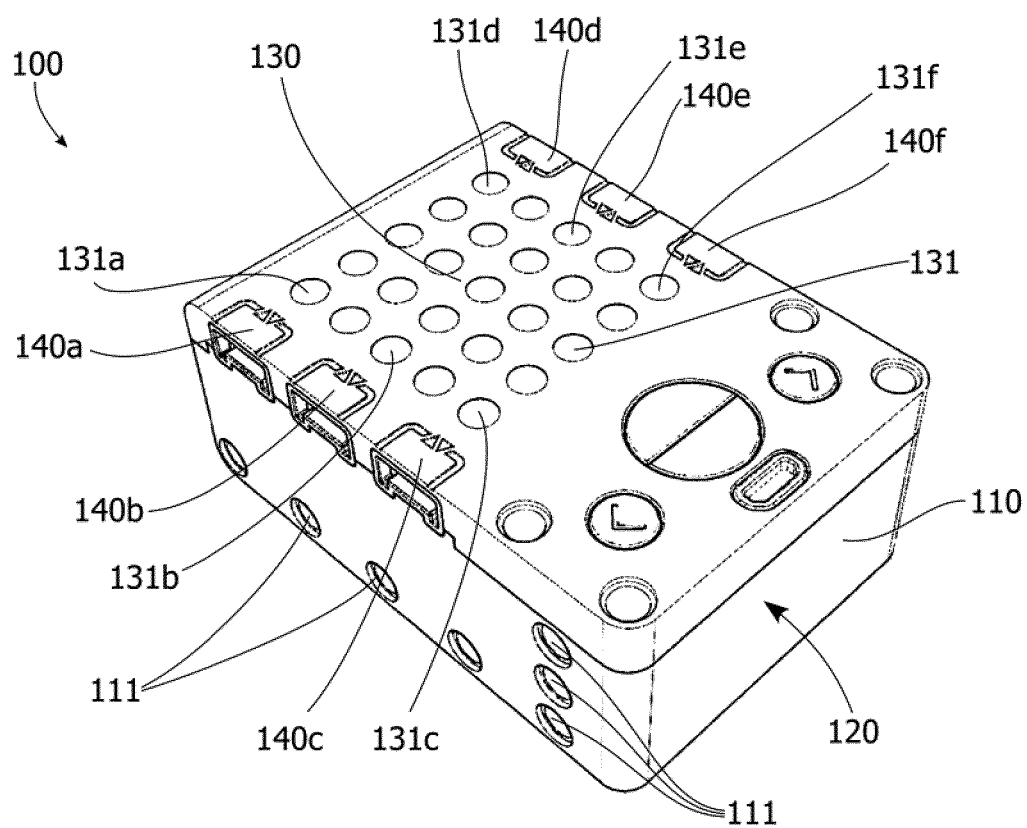
Fig. 4

TOY CONSTRUCTION SYSTEM WITH ROBOTICS CONTROL UNIT

CROSS-REFERENCE TO RELATED APPLICATIONS

This application is a U.S. National Stage of International Application No. PCT/EP2019/051720, filed on 24 Jan. 2019 and published on 1 Aug. 2019, as WO 2019/145405 A1, which claims the benefit of priority to Danish Patent Application No. PA 2018 70052, filed on 25 Jan. 2018. The content of each of the above referenced patent applications is incorporated herein by reference in its entirety for any purpose whatsoever.

The present invention relates in one aspect to a toy construction robotics system including a robotics control unit, wherein the robotics control unit comprises: a housing comprising coupling elements configured for releasably interconnecting the robotics control unit with cooperating toy construction elements; a processor comprising programmed instructions; and a plurality of I/O-ports configured to communicate with the processor.

BACKGROUND OF THE INVENTION

Toy construction systems including robotics controllers for use in the construction of toy robots with many functions provide a highly interactive and stimulating play experience for the user, and in particular for children. Robotics controllers, when integrated in a motion enabled toy construction model, in particular when combined with suitable peripheral devices, such as actuators and/or sensors, allow for bringing the model "to life" so as to perform programmed or even autonomous functions. Designing, building and programming such a robot is a challenging task which among others can stimulate an advanced learning experience of the user in a playful way.

However, in order to succeed with engaging the user in the task it is important to facilitate an intuitive understanding of the various steps in the building and programming process in a way suitable for a broad range of users, who may have very different levels of building and programming experience.

Therefore there is a need for an improved robotics controller, e.g. for use in robotics construction sets, and in particular for use in robotics toy construction models, which enhance the building and programming experience in a playful way.

SUMMARY OF THE INVENTION

A first aspect of the invention relates to a toy construction robotics system including a robotics control unit, wherein the robotics control unit comprises:
a housing comprising coupling elements configured for releasably interconnecting the robotics control unit with cooperating toy construction elements;
a processor comprising programmed instructions;
a plurality of I/O-ports configured to communicate with the processor; and
a plurality of separate light emitters, each of the light emitters being operable, in response to instructions from the processor, to selectively produce at least two different indicator states;
wherein the light emitters are arranged in a two-dimensional matrix of orthogonal columns and rows, each row extending between a first end and a second end, wherein the first ends of the rows define a first edge of the matrix and the second ends of the rows define a second edge of the matrix opposite to the first edge; wherein each of the I/O ports is positioned on a line defined by one of the rows and at one of the first and second ends of said row.

By thus arranging the separate light emitters and the I/O ports in an aligned relation to each other, the varying status of the toy construction robotics system, in particular different relations between I/O ports according to varying configurations of the robotics control unit can be dynamically visualised in a flexible yet unambiguous manner. For example, information on the current state of the toy construction system may be visualized as connections of peripheral devices or interactions with external devices are suggested and indicated to the user, as well as attempted, configured, and/or reconfigured in the course of constructing and/or operating a toy robotics build. Furthermore, the visualisation can be dynamically adapted each time to reflect the current state of the toy construction system. Thereby, a further improved visualization of the status of the different I/O ports by the light emitters according to a current configuration of the robotics control unit in the toy construction robotics system is achieved. The matrix layout in combination with the alignment of the I/O ports with their associated light emitters enhances the accessibility of the robotics control unit for its use in more complex builds by less experienced users.

The housing of the robotics control unit encases the processor, i.e. the processor is arranged in the housing. Thereby, an autonomous unit is provided. Preferably, the robotics control unit further includes an independent power supply in the same housing, thereby making the robotics control unit fully autonomous. At the same time, the housing has one or more coupling members configured for releasably interconnecting the robotic control unit with cooperating elements having corresponding coupling members. The housing thus provides coupling elements for integrating the robotics control unit with known toy construction elements in order to facilitate a modular and easily expandable play experience for constructing a toy robot. For example, the cooperating elements may include one or more toy construction elements, the toy construction elements comprising one or more coupling members configured for releasably interconnecting the toy construction elements with each other. Other examples for cooperating elements may include a support surface or a peripheral device equipped with such coupling members adapted for engaging the coupling members arranged on the robotics control unit. Thereby, the robotics control unit may easily be added to a toy construction model as an integral part, or as a retrofit. The presence of such coupling elements for interconnecting the robotics control unit with cooperating coupling elements of other toy construction elements is therefore important for its usefulness in the context of a toy construction system.

The term "I/O port" refers to an input-output port. The I/O ports are for implementing robotic functionality through peripheral sensors and/or motors. The I/O ports are adapted for both input and output. Under operation, however, the actual assignment of input and/or output tasks may depend e.g. on the peripheral device connected to the I/O port and the particular robotic function implemented through this I/O port.

The light emitters have macroscopic dimensions as further detailed below. Each separate light emitter is visually perceptible as an individual element by a human user and can be selectively operated in response to instructions from the processor. The light emitters are arranged on a front side of the housing in a two-dimensional arrangement with parallel rows and with columns that run orthogonal to the rows. The light emitters are furthermore aligned with respect to the I/O-ports such that each of the I/O-ports has an associated light emitter next to it. Most preferably, the I/O ports are located in extension of the rows outside the bounds defined by the first and second edges of the matrix.

The front side may be seen as the side on which the light emitters are arranged, which in operation can point in any direction, such as up, down, or sideways. The light emitters are thus visible from the outside of the housing. The terms "up" and "down" may be defined as vertical directions, i.e. essentially parallel to the direction of gravity. The term "sideways" may be defined as a direction at an angle with the vertical direction. For each of the I/O ports an associated light emitter is located in an edge portion of the two-dimensional arrangement of light emitters adjacent to the I/O-port. The associated light emitters can be activated to provide visual guidance to the user of the robotics control unit, e.g. relating to the correct use of I/O ports when building a robotics enhanced model. This facilitates an improved interactive learning experience, in particular for the un-experienced user, when building a complex robotics toy construction model.

As mentioned above, the light emitters are aligned with respect to the I/O-ports such that each of the I/O-ports has a uniquely associated light emitter next to it. Advantageously, this is achieved by placing the associated light emitter within an associated width of the I/O port as seen in a direction along the edge of the matrix. The associated light emitters are thus easily visually associated with their respective I/O ports. The associated width may be delineated by the width of the I/O port as seen in the direction along the edge of the matrix adjacent to the I/O-port. Further advantageously, the width of the I/O port may be marked up next to the edge of the matrix. Thereby a further improved guidance of the un-experienced user is provided to facilitate a further improved interactive learning experience.

Advantageously, the light emitters are dimensioned to correspond in scale to the dimensions of I/O ports in a toy construction system and the connectors used in such a context. Useful I/O-ports and cooperating connectors should be dimensioned for use with a manual building operation, and should in particular be suited for the use by children or by un-experienced users. Typical dimensions of such I/O-ports may be in the range of millimetres and/or centimetres. Accordingly, the light emitters, like the I/O-ports and cooperating connectors, also have macroscopic dimensions adapted for use in the context of direct human interaction, i.e. the light emitters are preferably dimensioned with transverse dimensions in the plane of the matrix in the range of millimetres and/or centimetres. While light emitter dimensions down to 0.5 mm are conceivable, a minimum transverse dimension of at least 1 mm, at least 2 mm, or at least 3 mm is desirable in order to properly resolve and distinguish the individual light emitters and to provide a proper association with the respective I/O-ports. An upper limit for the dimensions of the light emitters is determined by the arrangement of the I/O-ports, and may e.g. be determined by the actual width of the I/O-ports or by the associated width of the I/O-ports along the edge next to the I/O-port, and/or in relation to the distance between neighbouring I/O-ports.

In agreement with the macroscopic dimensions of the light emitters, the row spacing and the column spacing are also macroscopic. Advantageously, the row spacing is at least 0.5 mm, at least 1 mm, at least 2 mm, at least 3 mm or more. Further advantageously, the column spacing is at least 0.5 mm, at least 1 mm, at least 2 mm, at least 3 mm or more. Advantageously according to some embodiments, the rows and columns are evenly spaced. Preferably, the row spacing is the same throughout the matrix arrangement. Further preferably, the column spacing is the same throughout the matrix arrangement. Preferably, the matrix of rows and columns forms a square grid where the row spacing and the column spacing is the same throughout the matrix.

The purpose of the macroscopic light emitters is to provide an interactive guidance to the user during the construction and building of a robotics toy construction model. The macroscopic dimensioning and alignment of the separate light emitters with the I/O ports is also useful for interaction with the user in interactive games, e.g. games of the type "Simon says", e.g. requiring activation of a particular input or combination of inputs at I/O ports according to "Simon's" commands issued via the associated light emitters. A further, synergetic effect of the macroscopic dimensioning of the light emitters is achieved when controlling the light emitters to produce a machine readable digital code encoding data in respect of the control unit, wherein the machine readable digital code is presented as a visual pattern. As discussed above, the visual pattern may be captured using a compatible external device. Due to the macroscopic dimensioning of the light emitters forming the visual pattern, a reliable capturing of the visual pattern by an external device can be performed using cameras of commonly available mobile devices, or even cheap, low-resolution capturing devices. Furthermore, due to the macroscopic dimensioning of the light emitters, the process of the optical transmission of the encoded data from the robotics control unit to the external device becomes directly accessible to the user. This enhances the interactive learning experience of the building process and synergistically extends this experience to include the functional link to external devices interacting with the robotics control unit.

An interaction between the robotics control unit and its environment is thereby implemented in a manner that is directly accessible both during the building process as well as during the subsequent controlling and interacting with the finished build. The direct and associative visualization supports intuitive understanding of the interactions between the robotics control unit and the environment. Consequently an enhanced interactive play and learning experience is created as compared to prior art robotics control units that have I/O-ports and a front side display, but where the I/O-ports and the display are not correlated in the same manner as achieved by the particular alignment of the I/O ports with the rows and columns of separate light emitters according to the embodiments of the present invention.

A visualization of a state of the robotics control unit and/or of any associated peripheral devices connected thereto is also useful for purposes of calibrating any such components. For example, the calibration of sensors and/or actuators with respect to a specific parameter, such as orientation, position, temperature, intensity, colour, scale, or the like may be performed and/or confirmed in an intuitive and interactive way by visualizing the state of the robotics control unit and/or any associated peripheral devices connected thereto when performing a comparison to a corresponding reference and applying a correction, if applicable. It is even conceivable that the visualization on a first robotics control unit may reflect the state of an associated second robotics control unit communicating with the first robotics control unit, e.g. for purposes of calibration.

According to some embodiments, accessibility is supported by animated light effects, such as running or blinking lights, colour effects and/or any combinations thereof. According to some embodiments, accessibility is further supported by other means, such as acoustic signals/sounds, which are correlated with the visual transmission process, and which may furthermore be combined with any of the above visual effects. Relevant acoustic signals should be provided in a range of frequencies that is compatible with human hearing. Thereby the interactive experience may be further enhanced.

Alternatively or in addition to the I/O ports that are aligned with the rows, the system may comprise further I/O ports, which, in analogy to the I/O ports associated with rows, are associated with columns. This association is in an analogous manner obtained by aligning the further I/O ports with lines defined by the columns of the matrix. In analogy to the above, each of the columns extends from a third end to a fourth end, the third and fourth ends defining third and fourth edges of the matrix, respectively. Each of the further I/O ports may thus be positioned on a line defined by one of the columns and at one of the third and fourth ends thereof. Furthermore, the further I/O ports are most preferably located in extension of the columns outside the bounds defined by the third and fourth edges of the matrix. It is noted that equivalent considerations as those discussed herein regarding the alignment of the I/O ports with respect to the rows also apply to the alignment of the further I/O ports with respect to the columns of the orthogonal matrix arrangement. These considerations regarding both embodiments including such further I/O ports and advantages thereof are, therefore, considered as equivalent to the present disclosure and are not further detailed in the following.

Advantageously according to some embodiments, the above-mentioned advantages of the two-dimensional matrix layout of the separate light emitters in alignment with the I/O ports may be further supported by one or more of the following features.

Advantageously according to some embodiments, the number of rows in the two-dimensional arrangement of separate light emitters is at least three, at least five, or at least seven. Furthermore, the number of separate light emitters in each row is at least three, at least five, or at least seven. Accordingly, in some embodiments, the number of columns is at least three, at least five, or at least seven. An upper limit of the number of rows and/or columns is determined by the overall dimensions of the foot-print available on the housing for arranging the separate light emitters thereon and the macroscopic dimensions of the separate light emitters. Typically, the number of rows and/or the number of columns of separate light emitters on the robotics control unit does not exceed 20, or does not exceed 15, or does not exceed 12, or does not exceed 10.

Advantageously according to some embodiments, the I/O-ports are arranged along at least one edge of the two-dimensional arrangement of light emitters on the front side of the housing. The I/O ports are adapted for connecting compatible peripheral devices, such as motors, sensors, or user operable elements. The I/O ports thus provide an interface for user configurable input and/or output signals to and from the robotics control unit. The I/O ports may comprise electrical connectors, optical connectors, and may even comprise wireless ports, which may include a visual mark-up of the wireless I/O port next to the edge of the two-dimensional arrangement of light emitters. Each of the I/O-ports has an associated port width as seen along the edge of the two-dimensional arrangement of light emitters.

Further according to some embodiments, at least a first I/O port is arranged at the first end of the row and a second I/O port is arranged at the second end of the row. The first and second I/O-ports are thus positioned on the same line as defined by the corresponding row and at either end of that row.

Further according to some embodiments, a first group of first I/O ports is arranged along the first edge of the matrix and/or a second group of second I/O ports is arranged along the second edge of the matrix. Preferably, pairs of first and second I/O-ports are positioned on the same lines defined by the respective corresponding rows and at either end thereof. Preferably, the number of first group I/O-ports first group is equal to the number of second group I/O-ports. The rows are associated with at least one respective I/O port, such as a respective first I/O port and/or a respective second I/O port. The rows associated with I/O ports may be intercalated by one or more additional rows that are not assigned to particular I/O ports in the same way. This is e.g. useful for clearly indicating relations, such as physical and/or logical connections, between neighbouring I/O-ports or I/O ports belonging to neighbouring rows. The number of rows in the matrix is then typically a commensurable multiple of the number of I/O-ports or number of first and second I/O-port pairs, plus any terminating row(s).

First group I/O-ports have a first port width as seen in a direction along the first edge of the matrix. Second group I/O-ports have a second port width as seen in a direction along the second edge of the matrix. Each of the first group and second group I/O-ports may thus be attributed an associated port width along the first and second edges of the matrix, respectively. Each of the first and second group I/O ports has an associated light emitter as discussed above. Advantageously, for each of the first and second group I/O-ports the associated light emitter is located in a first or second edge portion of the matrix within the associated port width of the first or second group I/O-port as seen in a direction along the first or second edge of the matrix. Thereby a good visual association of the light emitters with their respective I/O ports is achieved as also discussed above.

Advantageously according to some embodiments of the robotics control unit, the number of first group I/O-ports is equal to the number of second group I/O-ports. Thereby a simple symmetrical layout configuration can be obtained. The symmetrical layout provides simplified alignment geometry for efficiently exploiting the foot print of the robotics control unit. Furthermore, by the symmetrical layout a visually intuitive alignment of the I/O ports with their associated light emitters is achieved. In combination, this facilitates the use of the robotics control unit for more complex builds by less experienced users.

Further according to some embodiments, the number of rows is equal to the number of columns. Such an arrangement is e.g. useful for representing certain types of visual patterns or machine readable visual codes, such as QR-codes.

Further according to some embodiments, the light emitters are operable, in response to instructions from the processor, to produce a machine readable code encoding data in respect of the robotics control unit.

By producing a machine readable digital code encoding data in respect of the robotics control unit, the robotics control unit can transmit information about itself and make such information available to other devices, machines, robots, or the like. These other devices, machines, robots, or the like may capture the machine readable code and decode the information contained in the encoded data in a more or less automated manner. The robotic control unit may thus directly communicate with such other devices, machines, robots, or the like.

Further according to some embodiments, multiple light emitters are operable in combination to produce a pattern, such as a two-dimensional pattern. The pattern may be a pattern that is configured for signalling to a user and/or adapted for signalling to an external device. A machine-readable code adapted for signalling to an external device may be represented as a two-dimensional pattern defined by a combination of any of the herein disclosed optical parameters of the light emitters, such as colour and intensity using a digital binary or multilevel discrete representation to form any suitable code, such as QR-codes; bar-codes or the like. The machine-readable code is encoded in a digital format, preferably according to a standardized protocol. Thereby, the robotics control unit is adapted to present the data for an efficient transmission of the information contained in the data. The following are examples for data in respect of the robotics control unit: status data; configuration data; identification data; instructions from the robotics control unit to other devices and any data relating to such instructions; status indications and configuration instructions to the user, e.g. when building and/or operating a toy robot constructed using the system.

Preferably, the pattern is adapted for optical recognition by an external device, thereby producing a machine-readable code that can be recognized by an external device merely by pointing an optical capturing device, such as a camera or a line scanner of the external device towards the light emitters of the robotics control unit. An external device may be equipped with an optical input device, such as an optical imaging sensor, a camera, a machine vision system, or an optical scanning device, and may further comprise an associated software module for processing optical input received from the optical input device, wherein the software module is further adapted for interpreting the processed optical input, and/or for recognizing predefined visual patterns in the optical input as captured by the optical input device. By providing a visual pattern that is adapted for optical recognition by an external device configured in such a way, an efficient communication with such an external device is facilitated.

Further according to some embodiments, the light emitters are operable to produce a time sequence of indicator states. Thereby an animated indication may be produced and presented to the user, such as blinking, running lights, or other time dependent visual effects. The time-sequence may also be combined with any of the other above-mentioned optical parameters for encoding a particular state. For example a red colour in combination with a (fast) blinking light may indicate an alert, whereas a green colour in combination with a (slowly) blinking light may indicate a waiting/ready state. Again multiple light emitters may be combined to produce a time-sequence of patterns. Furthermore, a time sequence of indicator states may be used to encode a machine readable digital code, e.g. a time-dependent two-dimensional pattern. While the former is a visible signal to the user, the latter may be a purely machine-readable encoding of data for transmission. Thereby, a large variety of codes is available for communicating efficiently with the user and/or external devices using visual patterns.

Further according to some embodiments, the light emitters comprise light emitters adapted to emit at least visible light. The machine-readable code is preferably a visual pattern, thereby facilitating an intuitive user interaction with the robotics control unit. The term 'visual' as used herein refers to the property of being visible to a human user. A 'visual pattern' thus refers to a pattern that is configured so as to be perceptible by human sight. The term 'visible' refers to light in the visible part of the electromagnetic spectrum, typically specified to the spectral range with wavelengths between 750 nm and 400 nm. By representing the machine readable digital code as a visual pattern on a front side of the housing, the transmission is directly visible to the user, thus allowing the user to monitor activity of the robotics control unit, e.g. in a communication process between the robotics control unit and other devices. Observing the communication process, the user may also intervene, e.g. to establish a connection, influence the flow of the communication, provide user input, and/or terminate the communication. The user may thus both follow and control the direct communication between the robotics control unit and other devices.

Thereby, machine-driven interaction between the robotics control unit and its environment is implemented in a manner that is directly accessible for the user—both during the building process as well as during the subsequent verification and interaction with the finished build. The direct and associative visualization supports intuitive understanding of the interactions between the robotics control unit and the environment. Thereby, a particularly instructive, intuitive, and interactive learning and play experience is facilitated.

Further according to some embodiments, the light emitters comprise light emitters that are further adapted for emission of infrared, preferably near infrared light, and/or UV-light. The infrared and/or UV spectral ranges are particularly useful for adding so-called invisible channels, such as for transmitting purely machine-readable data, to the so-called visible channel, which is chiefly intended for the user. The infrared and/or UV-spectral ranges are therefore particularly useful for conveying larger amounts of data at higher rates than would be accessible to the user. Advantageously according to some embodiments, the invisible channels are combined with the visible channels so as to multiplex the machine-readable code with visible signals intended for the user. The visible channel may thus, e.g. be used for user-guidance, for visualizing a data exchange between the robotics control unit and an external device, and/or for transferring basic amounts of data, whereas the invisible channel may be used as a parallel link for fast interaction and/or transfer of additional (possibly larger) data amounts.

Further according to some embodiments, the light emitters are operable to produce a machine readable code encoding data identifying the robotics control unit, data related to an internal status of the robotics control unit, data referring to a program stored in the robotics control unit, and/or data referring to a program activated in the processor of the robotics control unit, and/or similar data. Such data is e.g. useful for establishing and conducting machine communication and further facilitate advanced interaction with other devices, machines, robots and the likes. The data may further be data useful to transmit instructions to activate programmed instructions stored in the receiving device, communicate a particular configuration of the robotics control unit and peripheral components controlled by it, convey the availability for execution of specified programmed instructions stored in the robotics control unit, and/or indicate any error states.

Further according to some embodiments, the light emitters are operable to produce a machine readable code encoding instructions for interaction between the robotics control unit and an external device. The robotics control unit is thus adapted to transmit instructions to an external device for interaction with the robotics control unit. The robotics control unit and the instructions for interaction may be adapted for interaction with one or more external devices. The robotics control unit may thus interact with one or more external devices, wherein the one or more external devices may be mobile devices, and/or other robotics control units. For example, a mobile device may be a mobile phone, a tablet computer, a lap top computer, and/or a game controller. The other robotics control unit may be e.g. a robotics control unit that is compatible with or of the same type as the robotics control unit of the toy construction robotics system. The other robotics control unit may even be configured to simulate any of the mobile devices vis-á-vis the robotics control unit of the toy construction system.

Advantageously, such instructions are adapted to initiate or otherwise influence a further link between the robotics control unit and the external device in addition to the optical link relying on the optical transmission of machine readable codes. Advantageously, such a further link is configured for bi-directional communication between the robotics control unit and the external device, thereby supporting and enhancing the direct interaction between the robotics control unit and the external device. Advantageous examples for the further link are any form for wireless link, such as a direct wireless link, such as an infrared or radiofrequency link, or a wireless link mediated through a bus or digital network, such as a TCP/IP based wireless network or other suitable standards and infrastructure. Further advantageously, for reasons of modularity, efficiency and/or traceability, the communication through the further link complies with a standardized protocol, such as e.g. discussed in the European patent EP 2 341 993 B1.

According to some embodiments, the optical link via machine-readable digital codes presented as a visual pattern is merely adapted to "make contact", wherein the optical link is adapted to initiate a further link between the robotics control unit and the external device in an intuitive and interactive manner. Subsequently, the interaction between the robotics control unit and the external device may be transferred to the further link. This facilitates an intuitive and interactive way of creating a robotics enhanced model and subsequently bringing the enhanced model to play. Once established, the interaction between the external device and the robotics control unit through the further link may be visualized or otherwise modelled by the external device in a user perceptible manner.

Further according to some embodiments, the instructions for interaction include instructions for pairing, instructions for establishing a wireless link between the external device and the robotics control unit, and/or instructions for execution of programmed instructions by the external device, and/or instructions for internal two-way communication. The robotics control unit may thus provide the information necessary for communicating and otherwise interacting with it. The robotics control unit may also have instructions to directly control the external device, such as another robotics control unit. The robotics control unit may even prompt a compatible external device to retrieve any required instruction and execute these instructions. The external device may retrieve such programmed instructions from its own storage means, from an attached or otherwise storage, and/or from a network linked source. Thereby a reliable automated or semi-automated interaction can be initiated from the robotics control unit but established by the external device in a stable manner. This allows for flexibility in the choice of external devices. Thereby, an instructive interactive experience is achieved without overloading the robotics command unit with compatibility information, yet allowing for a larger variety of compatible external devices at the convenience of the user.

As mentioned above, the separate light emitters are separate elements having macroscopic dimensions. The separate light emitters may advantageously comprise light emitting diodes (LED). The separate light emitters may e.g. be individual LEDs, or based on light-emitting diodes (LED), or macroscopic elements, such as toy construction elements that are illuminated using LEDs.

Advantageously according to some embodiments, the light emitters have at least an "ON"-state and an "OFF"-state. An "ON"-state and an "OFF"-state, may be implemented by simply switching a power supplied to the light emitter on or off, respectively. Alternatively, the ON-state and the OFF-state may also be implemented as significantly differing intensities of light emitted by the light emitter, where the ON-state may be defined as exceeding an upper threshold intensity, and the OFF-state may be defined as emission with an intensity below a lower threshold intensity. More generally, different states of the separate light emitters, such as the above-mentioned "ON"-state and an "OFF"-state, may be implemented by different emission characteristics as distinguishable by optical parameters of the emitted light, such as different colours, wavelength ranges, intensities, and/or luminance, and any simultaneous and/or sequential combination thereof. Furthermore, each of the separate light emitters may produce more than two different states as expressed using any of the above-mentioned optical parameters or combinations/sequences thereof. By combining a number of the separate light emitters into a set even more complex information can be encoded. A set may include any integer number of multiple separate light emitters, such as at least two, at least three, at least four, at least six, or at least ten, up to the total number of separate light emitters in the matrix arrangement on the front side of the robotics control unit housing. By using separate light emitters the reliable distinction of the individual members of the set is ensured, thus allowing for reliable decoding of the information expressed by a given set. The different states may visualize a respective state, so as to point the user to a particular state of the robotics control unit itself, of the robotics control unit in the current context of the toy construction robotics system, and/or of the robotics control unit in relation to any further components or devices. In addition thereto, the different states may also be machine-read using optical capturing and detection techniques allowing for the distinction between the different states in terms of the different optical parameters used for expressing the different states. Thereby, a wealth of information can be visualized and expressed as a machine readable code and transferred using the individual light emitters. For example, the different states may be adapted to be readable with a mobile device or other external device, such as a mobile phone, a tablet, a further robot control unit, or the like, by using a pre-defined colour palette and/or a scheme of colour combinations, wherein the external device comprises capturing means, a processor, and programmed instructions for capturing and decoding such colour encoded information.

Further according to some embodiments, the light emitters are operable to render a graph indicating connections between two or more I/O ports, a graph indicating connections between one or more I/O-ports and one or more cooperating peripheral devices, and/or a graph representing an input received at one or more of the I/O-ports. The light emitters may thus be operated, in response to instructions from the processor, to visualize any relations between input to and/or output from the robotics control unit as provided through the involved I/O-ports as well as any related information, such as a graph relating to values read at a sensor connected to the robotics control unit, or a graph representing the synchronisation of outputs for motor control through two connected I/O-ports. The rendered connections may relate to, or may even directly reflect already established connections, thereby giving an intuitive indication of functionalities supported through peripheral devices and controlled by the robotics control unit in a particular build. Rendering already established connections is also useful for supporting and enhancing the learning experience. Advantageously according to some embodiments, the rendered connections further relate to connections to be formed, e.g. in order to complete a given model using the robotics control unit. Thereby, intuitive guidance can be provided while building the given model. The less experienced user may thus be guided to building a more complex model, thereby enhancing the tutorial effect of the learning experience. Advantageously, the rendering of a connection to be made is prompted by an input.

The input may be generated in response to user input and/or may be generated as part of a guided procedure for connecting peripheral devices to the robotics control unit. An example of such input may include a signal generated by an external device as a step in an interactive building plan executed on the external device and communicated to the robotics control unit. Another example may include a signal generated by a peripheral device that is activated to identify itself and broadcast such information. In response to such input, the robotics control unit may indicate one or more I/O-ports that are available for the connection to be formed, e.g. for connecting the identified peripheral device. Thereby, the interactive building experience is enhanced to allow e.g. less experienced users to build complex models.

Further according to some embodiments of the robotics control unit, the matrix of light emitters is configured to render a graph representing an input received at one or more of the I/O-ports. In particular, the light emitters may be operated, in response to instructions from the processor, so as to render a graph representing an input received at one or more of the I/O-ports. Advantageously, the graph is rendered to represent a signal value of a signal provided as input at the one or more I/O-ports. Thereby an intuitive visualisation of the input as "seen" by the robotics control unit is provided, which allows the user to follow the interaction between a model with the robotics control unit and its environment. The graph may further prompt the user or an external device observing the light emitter arrangement to interact with the robotics control unit.

Furthermore, the following embodiments of the robotics control unit specify advantageous features facilitating the interaction between the robotics control unit and cooperating/compatible peripheral devices. Preferably the specified interfaces of the I/O-ports are configured in a modular manner allowing for the interchangeable connection of compatible peripheral devices to the I/O-ports. Thereby a versatile connectivity of the I/O-ports with compatible devices is achieved. This is particularly useful for building complex robotics control systems in an intuitive manner that enhances the creative building experience. According to some embodiments, the I/O-ports are advantageously configured as interfaces for interacting with peripheral devices, such as sensors, motors, generators, and/or power sources. Further advantageously, the I/O-ports comprise one or more digital interfaces. Further advantageously, the I/O-ports comprise one or more analogue interfaces. Further advantageously, the I/O-ports are configured for wired and/or wireless communication with peripheral devices.

Further according to some embodiments, the system further comprises one or more toy construction elements, each toy construction element comprising one or more coupling members configured for releasably interconnecting the toy construction elements with the robotics control unit. Thereby a toy construction model built from the system can be brought to life with the particular advantages of an interactive learning and play experience as already discussed above in the context of the robotics control unit.

Further according to some embodiments, the system further comprises an external device, the external device comprising:
  a capturing device adapted to capture a machine readable code produced by the robotics control unit;
  decoding means programmed to decode the machine readable code; and
  programmed instructions using the decoded machine readable code as an input;

The robotics control unit is adapted to transmit encoded data in respect of the robotics control unit by producing a machine readable code encoding the data in respect of the robotics control unit on the front side of the housing. The external device is adapted to receive the encoded data in respect of the control unit by means of a capturing device configured to capture the machine readable code produced by the control unit. The external device further comprises programmed instructions for interacting with the robotics control unit using the received encoded data. The external device is thus configured for interacting with the robotics control unit. As mentioned above, the external device may be a mobile device, and/or another robotics control unit. For example, a mobile device may be a mobile phone, a tablet computer, a lap top computer, and/or a game controller, and the other robotics control unit may be e.g. a robotics control unit that is compatible with or of the same type as the robotics control unit of the toy construction robotics system. The other robotics control unit may even be configured to simulate any of the mobile devices vis-á-vis the robotics control unit of the toy construction system. Thereby, the interactive learning experience when using the toy construction robotics system is extended from a model build comprising the robotics control unit to include the interaction with external devices, which thus may be included in the interactive building and play experience. The advantages as already discussed above in the context of the robotics control unit are also achieved by this aspect of the invention, including the multiple facets of an interactive learning and play experience facilitated thereby.

Advantageously, the external device is adapted for analysing the captured visual pattern so as to decode the data encoded in the visual pattern. Further advantageously, the external device is adapted for receiving, processing and/or recognizing the machine readable visual code. Further advantageously, the external device is further adapted to interpret the received and decoded data as instructions. Further advantageously, the external device (and the robotics control unit) comprises communication means adapted for establishing a wireless link between the external device and the robotics control unit using the machine readable visual code.

Further according to some embodiments, the toy construction robotics system further comprises wireless communication means, wherein the external device is configured to establish a wireless link for interaction with the robotics control unit, based on the received and decoded data. In particular, the wireless link is a further link other than the link between the external device and the robotics control unit using the light emitters as emitters and the capturing device/decoding means as receiver. Advantageously, the further link may be established using programmed instructions for interacting as derived from decoded machine readable code. The further link may be based on radiofrequency communication using a standardized protocol, such as using any suitable digital communication protocol. The wireless link may also be via an IR link or the like. As mentioned above, the further link may even be implemented by multiplexing techniques, such as using spectral multiplexing techniques. For example, the light emitters of the two-dimensional matrix arrangement may comprise emitters emitting in spectral ranges adjacent to the visible range, such as one or more IR-bands and/or one or more UV-bands. In particular, the further link may advantageously be used for the direct interaction between multiple robotics control units.

Further according to some embodiments, the external device is a mobile device, such as a game controller, a mobile phone, a tablet computer, or a lap-top/portable computer, said mobile device comprising programmed instructions and a user interface, wherein said programmed instructions and user interface in combination are adapted for programming and/or controlling the robotics control unit.

Further according to some embodiments, the system further comprises:
 a capturing device communicating with the robotics control unit, wherein the capturing device is adapted to capture a machine readable code;
 decoding means programmed to decode the machine readable code; and
 programmed instructions using the decoded machine readable code as an input.

The robotics control unit is adapted to transmit encoded data in respect of the robotics control unit by producing a machine readable code encoding the data in respect of the robotics control unit on the front side of the housing. The robotics control unit is also adapted to receive encoded data by means of a capturing device configured to capture a machine readable code produced by e.g. another control unit. Such an embodiment is particularly useful when the toy construction robotics system is configured for the interaction of multiple robotics control units with each other, e.g. when building multiple robots configured for a game play, where the robots may encounter each other, upon encounter recognize/identify each other, and/or otherwise interact with each other. For example, a toy construction robotics system may comprises multiple robotics control units configured for interacting with each other, or a robotics control unit of a toy construction system is configured for interaction with one or more external devices, which are or may simulate one or more other robotics control units.

According to a further aspect of the invention, a toy construction robotics kit comprises a first system according to any of the above embodiments and a second system according to any of the above embodiments. Multiple toy construction systems according to any of the embodiments disclosed herein may thus be combined in a kit, e.g. for constructing interacting robots. Such a kit comprises multiple robotics control units, namely at least a first robotics control unit and a second robotics control unit. Advantageously, the multiple robotics control units are operable directly, and even autonomously, to interact with each other using the light emitters and capturing techniques as further detailed in the following.

According to some embodiments of a toy construction robotics kit, first light emitters of a first robotics control unit of the first system are operable to produce a machine readable code encoding data in respect of the first robotics control unit; and/or second light emitters of a second robotics control unit of the second system are operable to produce a machine readable code encoding data in respect of said second robotics control unit.

Further according to some embodiments of a toy construction robotics kit, the first system further comprises:
 a first capturing device communicating with the first robotics control unit, the first capturing device being adapted to capture the machine readable code produced by the second light emitters;
 decoding means programmed to decode the captured machine readable code; and
 programmed instructions for interacting with the first robotics control unit using the decoded machine readable code;
and/or the second system further comprises:
 a second capturing device communicating with the second robotics control unit, the second capturing device being adapted to capture the machine readable code produced by the first light emitters;
 decoding means programmed to decode the captured machine readable code; and
 programmed instructions for interacting with the first robotics control unit using the decoded machine readable code.

Multiple robotics control units may thus directly recognize and/or interact with each other in an autonomous manner. Alternatively or in addition thereto, the interaction may also be mediated/initiated by an external device communicating with the two or more robotics control units of the kit as discussed above with respect to the toy construction robotics system.

According to a yet further aspect of the invention, some exemplary embodiments of a method of controlling a robotics control unit are provided in the following. Such embodiments are useful for providing a both instructive and engaging experience to a user by enabling the user to create and understand a complex robotics build. By visualizing building steps and other steps of interaction of the robotics control unit with its environment on the robotics control unit itself, the methods become particularly useful for guiding even an un-experienced user to such achievements in an intuitively interactive way. Furthermore, the same advantages as discussed in relation to the robotics control unit (and the toy construction robotics system comprising such a robotics control unit) are also achieved by these methods in an analogous way. Amongst others, the methods disclosed herein are thus useful for a building and playing experience, which may include one or more of the following steps:
 creating an enhanced build comprising a robotics control unit, peripheral devices hooked up to I/O ports of the robotics control unit, and/or toy construction elements;
 creating the enhanced build using an interactive procedure;
 prompting the robotics control unit to provide indications of connections made and/or to be made between I/O ports of the robotics control unit and peripheral devices;
 prompting the robotics control unit to produce a machine readable digital code as a visual pattern;
 establishing contact between the robotics control unit and an external device by presenting the visual pattern to an optical input device of the external device, where the external device may be envisaged as "looking" at the robotics control unit so as to allow for capturing said visual pattern;

capturing the visual pattern, thus "reading" the machine readable digital code in a direct machine-to-machine communication;

based on the captured machine readable digital code, and in particular in response to data encoded in the captured data, developing instructions for interaction between the robotics control unit and the external device;

in response to these instructions initiating and establishing a further link between the external device and the robotics control unit;

transferring the control of the enhanced build to the external device, preferably communicating through the further link;

programming the robotics control unit and/or any peripheral devices connected to it, e.g. through a user interface on the external device; and/or remotely controlling the robotics control unit and/or any peripheral devices connected to it, e.g. through the user interface on the external device;

creating and configuring a user interface for interacting with the enhanced build;

interacting with the enhanced build from the external device; and/or programming and remotely controlling the enhanced build through a user interface on the external device;

Advantageously according to some embodiments, a method of controlling a robotics control unit comprises the steps of:

producing a machine readable digital code encoding data in respect of the robotics control unit, wherein the machine readable digital code is produced on the robotics control unit as a visual pattern;

presenting the visual pattern to an optical input device of an external device;

capturing the machine readable digital code by means of the optical input device of the external device to produce captured data representative of the data encoded in the machine readable digital code;

based on the captured data, developing instructions for interaction between the robotics control unit and the external device; and executing the instructions to establish said interaction.

Further according to some embodiments of the method, the instructions for interaction include instructions to initiate a further link between the external device and the robotics control unit. The further link is then established as a consequence of executing such instructions.

Further according to some embodiments, the method further comprises the step of providing on the external device a user interface for interaction with the robotics control unit.

Further according to some embodiments of the method, said user interface for interaction with the robotics control unit comprises:

elements adapted for programming the robotics control unit;

elements adapted for programming peripheral devices attached to I/O ports of the robotics control unit;

elements for remotely controlling the robotics control unit; and/or elements for remotely controlling peripheral devices attached to I/O ports of the robotics control unit.

Advantageously, the method of controlling a robotics control unit is implemented in a robotics control unit according to any of the embodiments as disclosed herein. Further advantageously, the method of controlling a robotics control unit is implemented in a toy construction robotics system including such a robotics control unit, and/or in a toy construction model including such a robotics control unit.

BRIEF DESCRIPTION OF THE DRAWINGS

Preferred embodiments of the invention will in the following be described in more detail in connection with the appended drawings, which show in FIGS. 1-3 prior art toy construction elements;

FIG. 4 a robotic control unit according to one embodiment;

DETAILED DESCRIPTION OF PREFERRED EMBODIMENTS

Figure 5:
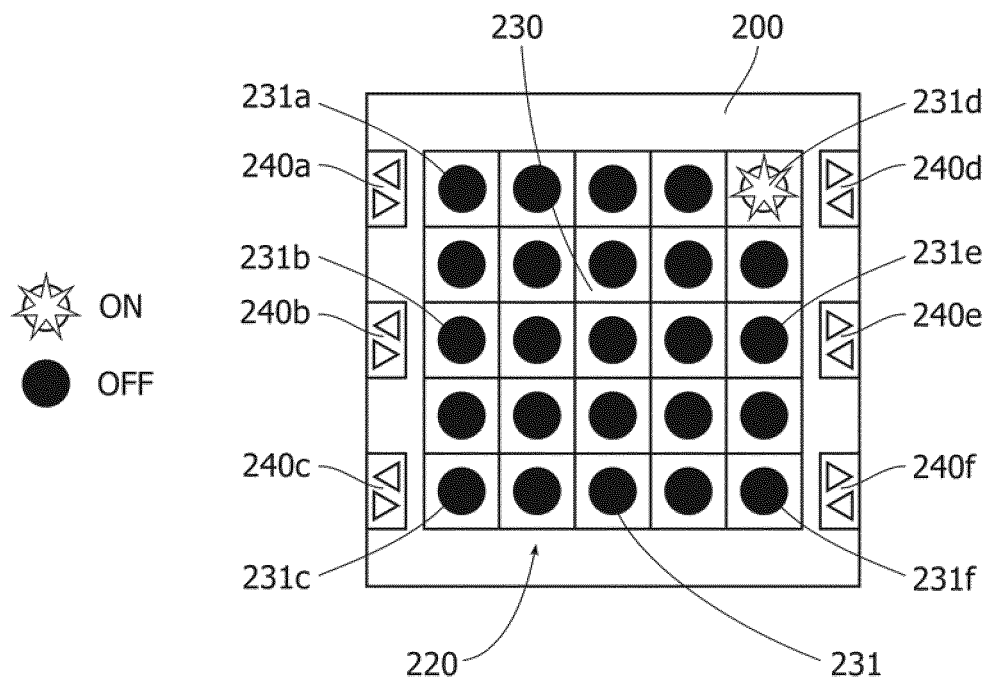
FIG. 5-7 schematically, embodiments of a robotics control unit with a matrix arrangement of separate light emitters that are aligned with respect to I/O-ports arranged along edges of the matrix; and in FIG. 8 a schematic of a robotic control system according to one embodiment.

Various aspects and embodiments of a robotics control unit as well as toy construction systems that are enhanced by including such a robotics control unit as disclosed herein, will now be described with reference to toy construction elements in the form of bricks. However, the invention may be applied to other forms of construction elements for use in toy construction sets.

FIG. 1 shows a toy construction element with coupling studs on its top surface and a cavity extending into the brick from the bottom. The cavity has a central tube, and coupling studs on another brick can be received in the cavity in a frictional engagement as disclosed in U.S. Pat. No. 3,005, 282. FIGS. 2 and 3 show other such prior art construction elements. The construction elements shown in the remaining figures have this known type of coupling members in the form of cooperating studs and cavities. However, other types of coupling members may also be used in addition to or instead of the studs and cavities. The coupling studs are arranged in a square planar grid, i.e. defining orthogonal directions along which sequences of coupling studs are arranged. The distance between neighbouring coupling studs is uniform and equal in both directions. This or similar arrangements of coupling members at coupling locations defining a regular planar grid allow the toy construction elements to be interconnected in a discrete number of positions and orientations relative to each other, in particular at right angles with respect to each other.

FIG. 4 shows a robotics control unit 100 according to one embodiment. The robotics control unit 100 has a housing 110 in which a processor 120 is arranged. The processor 120 comprises programmed instructions, which may be activated and executed in response to an input from a user, e.g. via user operable control elements on the robotics control unit, or from a device communicating with the robotics control unit, e.g. through a wired or wireless connection. A two-dimensional matrix 130 of orthogonal rows and columns of light emitters 131 is arranged on a front side of the housing 110, wherein the light emitters 131 are connected to communicate with the processor 120. The matrix 130 has a plurality of separate light emitters 131 that are arranged regularly spaced in a two-dimensional array. The light emitters 131 are arranged in a rectangular matrix of rows and columns. The separate light emitters 131 are individually controllable light emitters, such as light emitting diodes (LEDs). The light emitters 131 are operable in response to instructions from the processor 120.

The robotics control unit 100 further comprises a plurality of I/O-ports 140a-f that are connected to communicate with the processor 120. The I/O-ports 140a-f are arranged along opposite edges of the matrix 130, with a first group of I/O-ports 140a-c arranged along a first edge of the matrix 130, and with a second group of I/O ports 140d-f arranged along a second edge of the matrix 130 opposite to the first edge. Here, the number of I/O-ports 140a-c of the first group is equal to the number of I/O-ports 140d-f of the second group. The I/O-ports 140a-f include sockets that are arranged along edges of the front side of the housing 110, wherein the sockets are accessible for the insertion of cooperating plugs (not shown) from the side of the housing 110. The I/O-ports 140a-f define interfaces for the connection of peripheral devices. The interfaces may include digital signal channels, analogue signal channels, and/or a power supply output for powering the peripheral devices. Each of the I/O-ports 140a-f has an associated port width along the edge of the matrix, which in the embodiment of FIG. 4 is marked up next to the matrix 130 along the respective edge, on the front side of the housing 110. The I/O-ports are dimensioned for use with a manual building operation in the context of a toy construction system as described herein, and should in particular be suited for the use by children or by unexperienced users in such manual building operations.

The light emitters 131 are aligned with respect to the I/O-ports 140a-f such that each of the I/O-ports 140a-f has a respective, uniquely associated light emitter 131a-f next to it. In particular, the rows of the matrix of light emitters 131, the first group of I/O-ports 140a-c and the second group of I/O-ports 140d-f are aligned with respect to each other such that each of the first group I/O-ports 140a-c is arranged in line with a corresponding second group I/O-port 140d-f via a row of light emitters 131. The light emitters are dimensioned to correspond in scale to the dimensions of I/O ports to allow for easy association, typical dimensions being of several millimetres up to a few centimetres.

In between the rows comprising the light emitters 131a-f, further light emitters 131 are arranged in an equally spaced grid, thereby increasing the amount and diversity of information that can be presented as a visual pattern by the robotics control unit without compromising the unique association between the I/O-ports 140a-f and the associated light emitters 131a-f.

The housing 110 also has one or more coupling members 111 configured for releasably interconnecting the robotic control unit with cooperating toy construction elements having corresponding/cooperating coupling members. These coupling members 111 allow for mechanically attaching the robotic control unit 100 to toy construction elements and thus integrating the robotics control unit 100 in a toy construction model, e.g. in connection with peripheral devices also comprising such coupling members, such as motors and sensors. Thereby, the toy construction model can be "brought to life" to enhance the user's interactive play and learning experience.

Advantageously, the robotics control unit 100 also comprises a power source adapted to supply at least the robotics control unit 100 and further advantageously can provide power to attached peripheral devices, e.g. through an I/O-port interface. Peripheral devices may include, but are not limited to motors, or sensors. Any suitable power source may be conceived. An autonomous power supply integrated in the robotics control unit is, however, preferred. Non-limiting examples for such autonomous power supplies are: a battery pack, such as a rechargeable battery pack; energy harvesting devices, such as photovoltaic elements; or electrochemical power converters, such as fuel cells with an adequate fuel supply/reservoir. This has the advantage that the robotics control unit 100 can easily be integrated in a toy construction model in a flexible manner, and toy construction models comprising one or more such autonomous robotics control units 100 can move around in an autonomous manner, thereby enhancing the user's interactive play and learning experience when building such a toy construction model and subsequently interacting with the completed build.

Figure 6:
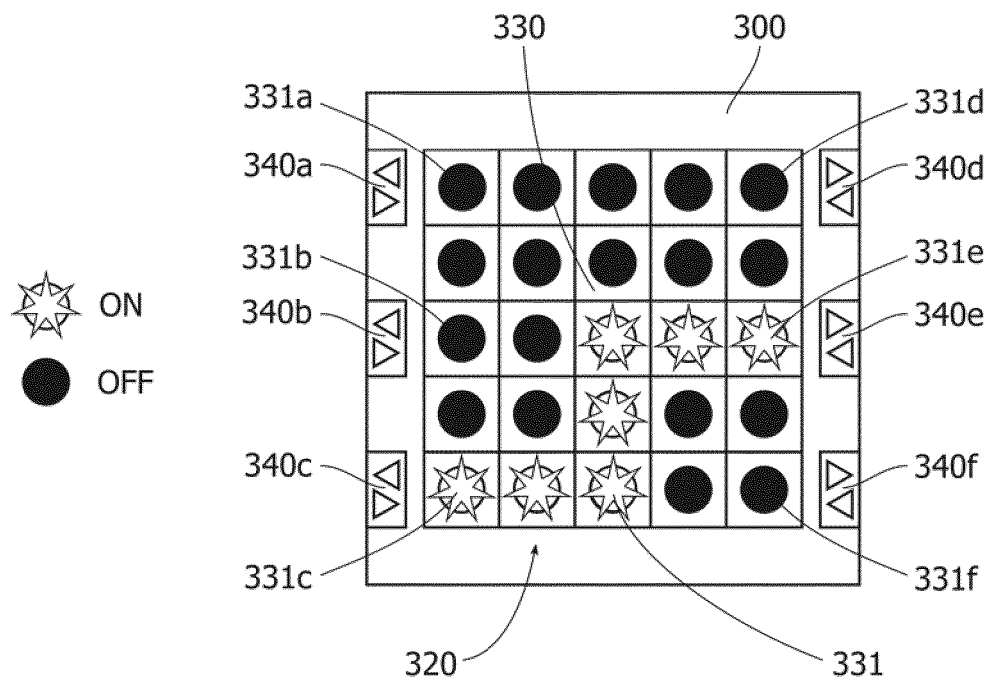
Figure 7:
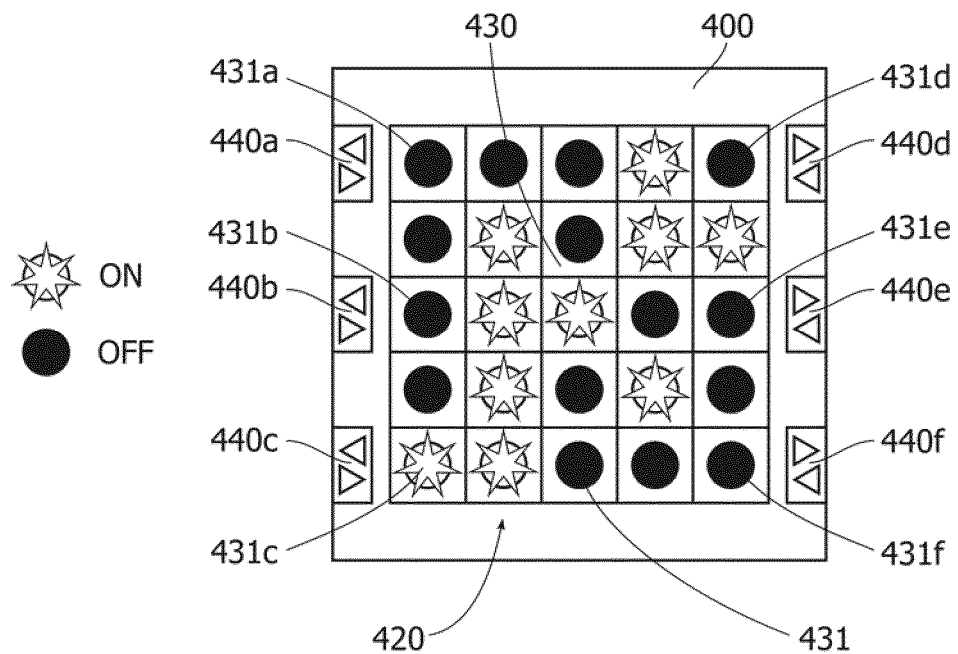

Referring now to FIGS. 5-7, three different embodiments of the robotics control unit 200, 300, 400 are discussed. The different embodiments relate to different configurations facilitating different modes of interaction of the robotics control unit 200, 300 400 with its surroundings by means of the light emitters 231, 331, 431.

In all three figures, FIG. 5-7, a robotics control unit 200, 300, 400 is shown schematically in a top view with a matrix 230, 330, 430 having separate light emitters 231, 331, 431 arranged in a two-dimensional arrangement covering a portion of a front side of the robotics control unit 200, 300, 400. A first group of I/O-ports 240a-c, 340a-c, 440a-c is distributed along a left edge of the matrix 230, 330, 430, and a second group of I/O-ports 240d-f, 340d-f, 440d-f is distributed along a right edge of the matrix 230, 330, 430. By way of example, there are three first group I/O-ports 240a-c, 340a-c, 440a-c and three second group I/O-ports 240d-f, 340d-f, 440d-f. The first group of I/O-ports 240a-c, 340a-c, 440a-c, the second group of I/O-ports 240d-f, 340d-f, 440d-f, and the light emitters 231, 331, 431 are aligned with respect to each other such that each of the first group I/O-ports 240a-c, 340a-c, 440a-c is arranged in line with a corresponding second group I/O-port 240d-f, 340d-f, 440d-f, through a row of separate light emitters 231, 331, 431. Each of the I/O ports 240a-f, 340a-f, 440a-f has a uniquely associated light emitter 231a-f, 331a-f, 431a-f immediately next to it. A first group I/O-port 240a, 340a, 440a is thus visually associated with a corresponding second group I/O-port 240d, 340d, 440d via the row of light emitters 231, 331, 431 extending from light emitter 231a, 331a, 431a to light emitter 231d, 331d, 431d. In the same manner the first group I/O ports labelled "b" are visually connected to the I/O ports labelled "e" via the row comprising the associated light emitters labelled "b" and "e", respectively; and accordingly for the I/O-ports labelled "d" and "f" with associated light emitters labelled "d" and "f".

By way of example, each of the matrix arrangements 230, 330, 430 shown in FIGS. 5-7 have 25 separate light emitters 231, 331, 431, that are distributed in an evenly spaced rectangular matrix of five rows by five columns: three rows of light emitters 231, 331, 431 comprising the associated light emitters 231a-f, 331a-f, 431a-f are aligned with the I/O ports 240a-f, 340a-f, 440a-f as described above; and two interstitial rows, wherein an interstitial row is placed each time midways between the aligned rows. Each row is formed by five light emitters 231, 331, 431.

The light emitters 231, 331, 431 can be individually addressed and controlled in response to instructions from the processor. The light emitters 231, 331, 431 have at least an "ON"-state, where the light emitter is switched on to emit light, and an "OFF"-state, where the light emitter is switched off and essentially does not emit light. The "ON" and "OFF" states may e.g. be characterized by threshold values of minimum intensity of light emission for the "ON"-state and of maximum intensity of light emission for the "OFF" state. Intermediate states with intermediate intensities of light emission between an "ON" state and an "OFF" state are conceivable and allow for increasing the information depth of the pattern produced by the ensemble of light emitters 231, 331, 431. Thereby, a variety of patterns can be produced representing different data and/or information relating to the robotic control unit 200, 300, 400 and its interaction and/or interconnection with its environment. Due to the spatial alignment, the data and/or information can selectively and/or collectively be associated with one or more specific ones of the I/O-ports 240*a-f*, 340*a-f*, 440*a-f* of the robotic control unit 200, 300, 400. This allows for providing a particularly intuitive understanding of the state of the robotics control unit 200, 300, 400, thereby involving and enabling the user in an interactive play and learning experience.

The data and/or information is presented according to instructions executed and issued by the processor as prompted by suitable input to the robotics control unit 200, 300, 400. For example, the robotics control unit 200, 300, 400 may be prompted to execute programmed instructions stored in the robotics control unit 200, 300, 400 itself or to execute instructions received from a connected unit or remote control/programming device via a suitable link, such as a wired or a wireless connection. The execution may also be prompted by instructions received as a direct input from a user via a user operable control element on the robotics control unit 200, 300, 400. By way of example, the robotics control unit 200, 300, 400 may present information related to a state of: the robotic unit itself; a peripheral device connected to one of the I/O-ports 240*a-f*, 340*a-f*, 440*a-f* of the robotics control unit 200, 300, 400; a toy construction robotics system of which the robotics control unit 200, 300, 400 is a part of; a toy construction model of which the robotics control unit 200, 300, 400 is a part of; an I/O-port connection made or to be made according to a step of a building plan; an I/O port connection for a specified/identified peripheral device; or a verification of established connections.

The robotics control unit 200 shown in FIG. 5 is configured to activate/deactivate, according to instructions from the processor 220, one or more of the associated light emitters 231*a-f* arranged next to the respective I/O-ports 240*a-f*. Such a scheme of activating/deactivating the associated light emitters 231*a-f* may be useful for indicating a status of a connection established at the respective I/O-ports 240*a-f*, such as successful connection, or input/output activity at that connection. The activation/deactivation scheme of the robotics control unit 200 shown in FIG. 5 may also be used for visualizing a status related to a peripheral device connected to a given I/O-port 240*a-f*, by means of the associated light emitter 231*a-f*. The status related to the peripheral device may e.g. be a working/non-working status. The activation/deactivation scheme may further visually represent a value of input or output data exchanged with the peripheral device, such as a value of a quantity measured by a sensor, or a value of power output to a motor. The measured quantities may advantageously relate to physical quantities that are useful for robotics applications, such as motion, touch, proximity, pressure, temperature, current/voltage, light intensity, colour, pattern recognition, magnetic fields, gyroscopic orientation, location, positioning, or similar. Using the spatial correlation of the associated light emitters with the respective I/O-ports, the activation/deactivation scheme of the embodiment 200 of FIG. 5 particularly emphasizes the association between the specific I/O port receiving the relevant input from the peripheral device and the visualized quantity. The intuitive link created by the activation/deactivation scheme between the visualized value, the I/O-port and the peripheral device attached thereto thus provides a particularly instructive play and learning experience for a user of the robotics control unit 200. A further, particularly useful application of this embodiment 200 is for enhancing the interactive play and learning experience when the activation/deactivation scheme of FIG. 5 is prompted according to the steps of a building plan for building a robotics toy construction model including the robotics control unit 200. Visualizations according to this activation/deactivation scheme may include checking for required connections, indicating specific connections to be made in a particular step of the building plan, identifying a specific I/O-port in response to communicating the identity of a specific peripheral device to the robotics control unit, and/or verifying the validity of established connections.

The visualizations may be implemented using a simple activation/deactivation scheme switching the respective light emitters "ON" and "OFF" according to instructions from the processor receiving the relevant input. The visualizations may involve controlling parameters of the light emission such as colour, intensity, and duration, and may even include controlling the light emission in a pulsed or otherwise time-dependent sequence. The activation/deactivation scheme of the robotics unit 200 of FIG. 5 may further involve light emitters 231 adjacent to the associated light emitters 231*a-f* of the relevant I/O-ports 240*a-f*. For example, the adjacent light emitters may be included in the activation/deactivation scheme to symbolize a value by the length of a line of light emitters 231 starting from and including the associated light emitter 231*a-f*. It is further conceivable to emphasize a particular visualization by time-dependent/sequence effects such as blinking or a chase light effect.

The robotics control unit 300 shown in FIG. 6 is configured to activate/deactivate, according to instructions from the processor 320, at least two of the associated light emitters 331*a-f* arranged next to the respective I/O-ports 340*a-f*, and further activate/deactivate light emitters connecting the two associated light emitters 331*a-f*. Such a scheme of activating/deactivating the light emitters 331 may be useful for indicating a connection established between the respective I/O-ports 340*a-f* appertaining to the involved associated light emitters 331*a-f*.

As above, the visualizations may be implemented using a simple activation/deactivation scheme switching the relevant light emitters "ON" and "OFF" according to instructions from the processor 320 receiving relevant input. The visualizations may involve controlling parameters of the light emission such as colour, intensity, and duration, and may further include controlling the light emission in a pulsed or otherwise time-dependent sequence.

The robotics control unit 400 shown in FIG. 7 also makes use of a two-dimensional matrix 430 having separate light emitters 431 that are arranged regularly spaced in a well-defined rectangular grid of rows and columns. The grid of light emitters 431 is aligned with respect to the I/O-ports 440*a-f* as already described above. The robotics control unit 400 is configured to activate/deactivate, according to instructions from the processor 420, the ensemble of light emitters 431 so as to form a machine-readable two-dimensional visual pattern. The two-dimensional visual pattern represents a digital code that encodes data pertaining to the robotics control unit 400, such as data identifying the robotics control unit 400, data related to an internal status of the robotics control unit 400, data referring to programs stored in the robotics control unit 400, and data referring to a program activated in the processor of the robotic control unit 400. The visual pattern is adapted for optical recognition by an external device, such as a camera of a mobile device. This is particularly useful for communicating with an external device in an intuitive and straightforward manner as further detailed below with respect to FIG. 8.

As above, the visualizations may involve controlling parameters of the light emission such as colour, intensity, and duration, and may further include controlling the light emission in a pulsed or otherwise time-dependent sequence. Advantageously in this embodiment, the visualizations are implemented using a simple activation/deactivation scheme switching the relevant light emitters "ON" and "OFF" according to instructions from the processor 420, so as to form a machine-readable two-dimensional digital code that can be captured by a simple optical scanning device, such as a camera of a mobile device.

The different embodiments of FIG. 5-FIG. 7 may be implemented as different activation/deactivation schemes within the same robotics control unit and selected/triggered depending on input, or automatically according to an interactive building plan running on an external device. The external device may be paired and may communicate with a robotics control unit, e.g. in a robotics control system 500 as further detailed in the following with reference to FIG. 8.

Figure 8:
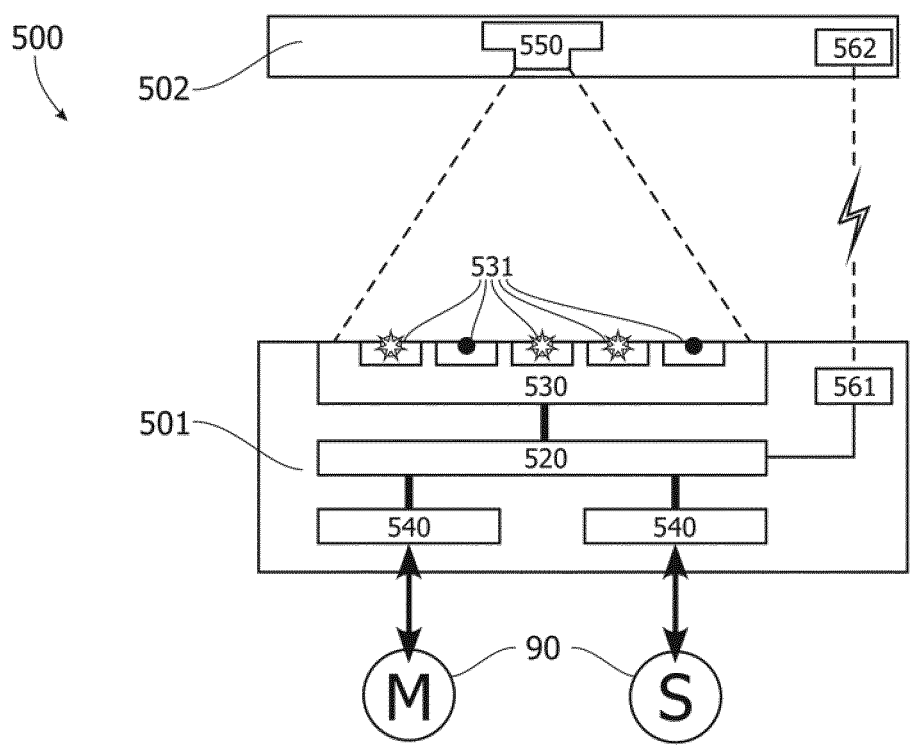

FIG. 8 shows a robotics control system 500 comprising a robotics control unit 501 and an external device 502 adapted to interact with the robotics control unit 501. The robotics control unit 501 has a processor 520 and a matrix 530 connected to the processor 520. The matrix 530 has separate light emitters 531 that individually can be addressed and activated/deactivated in response to instructions from the processor 520 so as to present a machine-readable visual pattern on a front side of the robotics control unit 501. The robotics control unit 501 further comprises I/O-ports 540 for communicating with peripheral devices 90, such as motors M or sensors S. The I/O-ports are aligned with the light emitters 531 of the matrix 530 as already described elsewhere herein.

The control unit 501 is adapted to transmit encoded data related to the control unit 501 by presenting on the matrix 530 of separate light emitters 531 a machine readable visual pattern encoding such data. By way of example, this is achieved by a control scheme according to the embodiment of the robotics control unit 400 as described above with respect to FIG. 7.

The external device 502 is adapted to receive the encoded data related to the control unit by means of a capturing device 550 configured to capture the visual pattern produced by the control unit 501. The external device 502 further comprises programmed instructions for interacting with the robotics control unit 501 using the received encoded data.

The visual pattern presented on matrix 530 is adapted for optical recognition by an external device 502. The external device comprises an optical input device 550, such as an optical imaging sensor, a camera, a machine vision system, or an optical scanning device; and a processor with an associated software module for processing optical input received by the optical input device 550 for optical recognition thereof. The data in respect of the control unit may comprise instructions for interaction between the external device 502 and the robotics control unit 501.

Such instructions for interaction may, for example, include instructions for pairing of the robotics control unit 501 with the external device 502 for communication through a wireless link. Such instructions for interaction may also include instructions for establishing such a wireless link between the external device 502 and the robotics control unit 501, and/or instructions for execution of programmed instructions stored on or downloaded to the external device 502.

The machine-readable link, which at the same time is visible to the user, is particularly useful for communicating with an external device in an intuitive and straightforward, yet highly flexible manner. The user is typically involved in initiating and/or controlling the link between the two machines (i.e. between the robotics control unit 501 and the external device 502). At the same time, the working of this machine-link is visualized to the user: the user can see the interaction between the robotics control unit 501 and the external device 502 being established and happening right in front of her. Building, establishing, and following the communication process in this manner is therefore very instructive—again enhancing the interactive play and learning experience.

As already discussed above, the visual patterns for encoding the data may involve controlling parameters of the light emission of the light emitters 531, such as colour, intensity, and duration, and may further include controlling the light emission in a pulsed or otherwise time-dependent sequence. Advantageously in this embodiment, the visualizations are implemented using a simple activation/deactivation scheme switching the relevant light emitters "ON" and "OFF" according to instructions from the processor 420, so as to form a machine-readable two-dimensional digital code that can be captured by a simple optical scanning device, such as a camera of a mobile device. The encoded data may further be represented as a time-sequence of different visual patterns which is detectable in a time-resolved manner by the external device using time-resolved capturing and pattern processing.

The invention claimed is:

1. A robotics control unit for use in a toy construction robotics system, wherein the robotics control unit comprises:
   a housing comprising coupling elements configured for releasably interconnecting the robotics control unit with cooperating toy construction elements;
   a processor comprising programmed instructions;
   a plurality of I/O-ports configured to communicate with the processor;
   a plurality of separate light emitters, each of the light emitters being operable, in response to instructions from the processor, to selectively produce at least two different indicator states;
   wherein the light emitters are arranged in a two-dimensional matrix of orthogonal columns and rows, each of the rows extending between a first end and a second end, wherein the first ends of the rows define a first edge of the matrix and the second ends of the rows define a second edge of the matrix opposite to the first edge;
   wherein each of the plurality of I/O ports is positioned on a line defined by one of the rows and at one of the first and second ends of said row; and
   wherein the light emitters are operable, in response to instructions from the processor, to produce a machine readable code encoding data in respect of the robotics control unit.

2. The robotics control unit according to claim 1, wherein at least a first of the plurality of I/O ports is arranged at the first end of the row and a second of the plurality of I/O ports is arranged at the second end of the row.

3. The robotics control unit according to claim 2, wherein a first group of first I/O ports is arranged along the first edge of the matrix and/or wherein a second group of second I/O ports is arranged along the second edge of the matrix.

4. The robotics control unit according to claim 1, wherein the number of rows is equal to the number of columns.

5. The robotics control unit according to claim 1, wherein multiple light emitters are operable in combination to produce a pattern.

6. The robotics control unit according to claim 1, wherein the light emitters are operable to produce a time sequence of indicator states.

7. The robotics control unit according to claim 1, wherein the light emitters comprise light emitters adapted to emit visible light.

8. The robotics control unit according to claim 1, wherein at least one of the light emitters is adapted for emission of infrared, preferably near infrared light, and/or UV-light.

9. The robotics control unit according to claim 1, wherein the light emitters are operable to produce a machine readable code encoding one or more of: data identifying the robotics control unit, data related to an internal status of the robotics control unit, data referring to a program stored in the robotics control unit, and data referring to a program activated in the processor of the robotics control unit.

10. The robotics control unit according to claim 1, wherein the light emitters are operable to produce a machine readable code encoding instructions for interaction between the robotics control unit and an external device.

11. The robotics control unit according to claim 10, wherein the instructions for interaction include one or more of: instructions for pairing, instructions for establishing a wireless link between the external device and the robotics control unit, and instructions for execution of programmed instructions by the external device.

12. The robotics control unit according to claim 1, wherein the light emitters are operable to render one or more of: a graph indicating connections between two or more I/O ports, a graph indicating connections between one or more I/O-ports and one or more cooperating peripheral devices, and a graph representing an input received at one or more of the I/O-ports.

13. The robotics control unit according to claim 1, wherein the plurality of I/O-ports are configured as interfaces for interacting with peripheral devices, such as sensors, motors, generators, and/or power sources.

14. The robotics control unit according to claim 1, wherein the plurality of I/O-ports each comprise one or more digital interfaces.

15. The robotics control unit according to claim 1, wherein the plurality of I/O-ports are configured for wired and/or wireless communication with peripheral devices.

16. A toy construction robotics system including a robotics control unit according to claim 1, the toy construction robotics system further comprising one or more toy construction elements, each of the one or more toy construction elements comprising one or more coupling members configured for releasably interconnecting the one or more toy construction elements with the robotics control unit.

17. The system according to claim 16, further comprising an external device, the external device comprising:
a capturing device adapted to capture the machine readable code produced by the robotics control unit;
decoding means programmed to decode the machine readable code; and
programmed instructions using the decoded machine readable code as an input.

18. The system according to claim 17, wherein the external device is a mobile device, the mobile device comprising one of a game controller, a mobile phone, a tablet computer, or a laptop/portable computer, said mobile device comprising programmed instructions and a user interface, wherein said programmed instructions and user interface in combination are adapted for programming and/or controlling the robotics control unit.

19. The system according to claim 16, the system further comprising:
a capturing device communicating with the robotics control unit, wherein the capturing device is adapted to capture a machine readable code;
decoding means programmed to decode the machine readable code; and
programmed instructions using the decoded machine readable code as an input.

20. A toy construction robotics kit comprising a plurality of toy construction robotics systems according to claim 16.

21. The kit according to claim 20, wherein first light emitters of a first robotics control unit of a first said system are operable to produce a machine readable code encoding data in respect of the first robotics control unit; and
wherein second light emitters of a second robotics control unit of a second said system are operable to produce a machine readable code encoding data in respect of said second robotics control unit.

22. The kit according to claim 21, wherein the first system further comprises:
a first capturing device communicating with the first robotics control unit, the first capturing device being adapted to capture the machine readable code produced by the second light emitters;
decoding means programmed to decode the captured machine readable code; and
programmed instructions for interacting with the first robotics control unit using the decoded machine readable code;
and wherein the second system further comprises:
a second capturing device communicating with the second robotics control unit, the second capturing device being adapted to capture the machine readable code produced by the first light emitters;
decoding means programmed to decode the captured machine readable code; and
programmed instructions for interacting with the first robotics control unit using the decoded machine readable code.

23. A method of controlling a robotics control unit using an external device, wherein the robotics control unit is the robotics control unit according to claim 1, the method comprising the steps of:
producing a machine readable digital code encoding data in respect of the robotics control unit, wherein the machine readable digital code is produced as a visual pattern;
presenting the visual pattern to an optical input device of the external device;
capturing the machine readable digital code by means of the optical input device of the external device to produce captured data representative of the data encoded in the machine readable digital code;

based on the captured data, developing instructions for interaction between the robotics control unit and the external device; and executing the instructions to establish said interaction.

24. The method according to claim 23, wherein the instructions for interaction include instructions to initiate a further link between the external device and the robotics control unit.

25. The method according to claim 23, further comprising the step of providing on the external device a user interface for interaction with the robotics control unit.

26. The method according to claim 25, wherein said user interface for interaction with the robotics control unit comprises one or more of:

elements adapted for programming the robotics control unit;

elements adapted for programming peripheral devices attached to the plurality of I/O ports of the robotics control unit;

elements for remotely controlling the robotics control unit; and elements for remotely controlling peripheral devices attached to the plurality of I/O ports of the robotics control unit.

* * * * *